Jan. 2, 1934. M. STAHL 1,942,310
LID CONNECTION
Filed Dec. 17, 1932
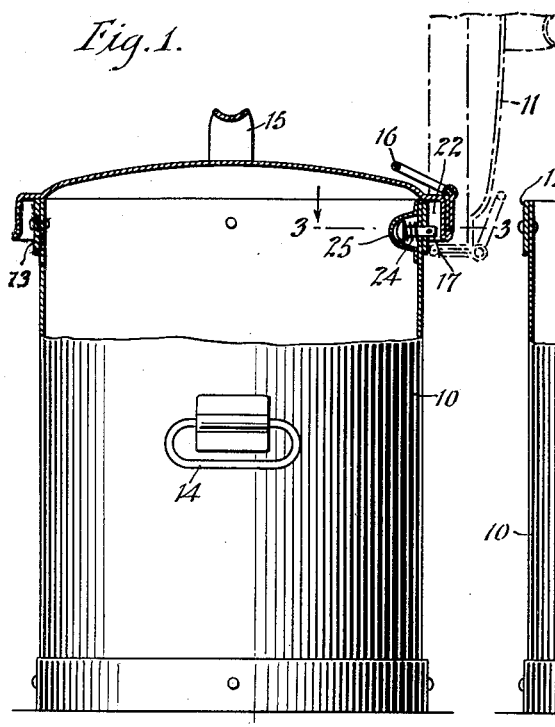
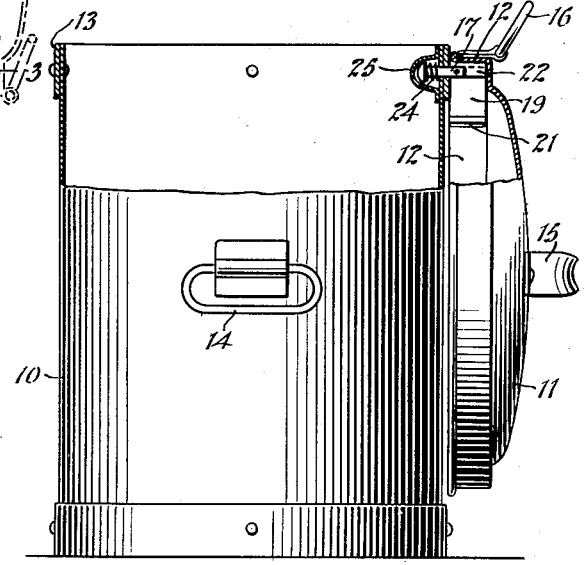
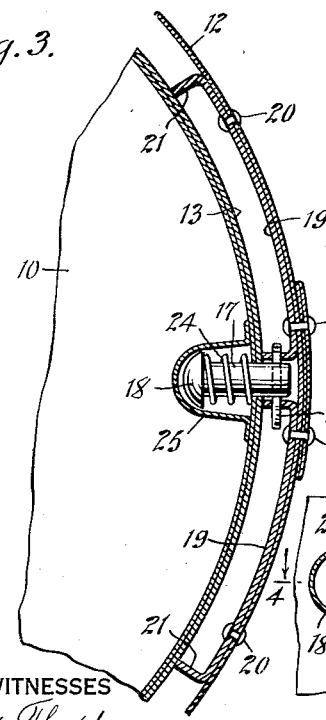
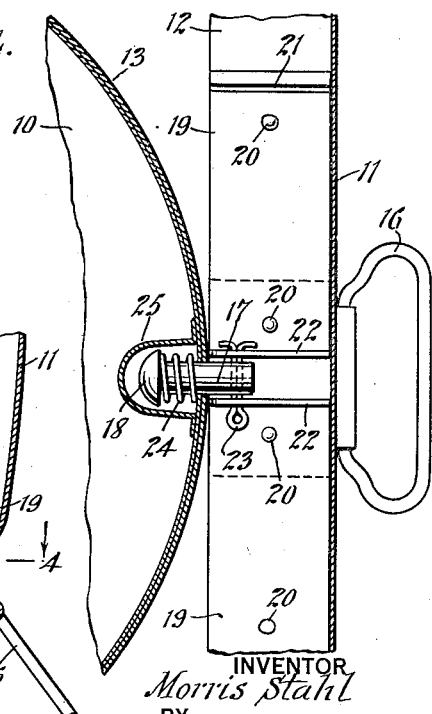
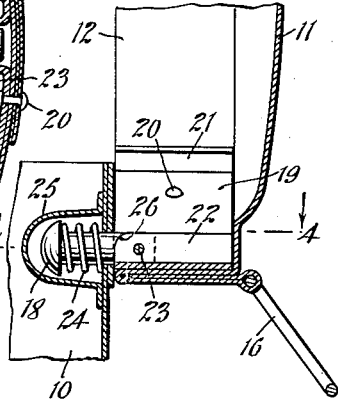
WITNESSES
Edw. Thorpe
Chris Feinle
INVENTOR
Morris Stahl
BY
Munn, Anderson, Stanley, Foster & Liddy
ATTORNEY Patented Jan. 2, 1934

1,942,310

UNITED STATES PATENT OFFICE 1,942,310

LID CONNECTION

Morris Stahl, Brooklyn, N. Y.

Application December 17, 1932
Serial No. 647,801

9 Claims. (Cl. 220—37)

This invention relates to the class of containers and receptacles having lids or covers, and has especial reference to the means connecting a lid or cover with the container or receptacle.

An object of the invention is the provision of a connection between a container or receptacle and a lid or cover therefor, whereby the lid or cover may be swung to opened and closed positions in such manner as not to require the amount of space usually required for swinging lids or covers on containers or receptacles.

Another object of the invention is the provision of a connection of the indicated character, which is adapted to retain a lid or cover in a closed position to prevent bugs, flies, insects, and the like from entering and leaving the container or receptacle and spreading disease germs.

Another object of the invention is the provision of a resilient connection between a lid or cover and a container body, whereby the lid or cover may be swung from a horizontal closed position to a vertically-disposed partly opened position and to be swung from said position to a fully opened position disposed at one side of the container body below the upper end thereof.

Another object of the invention is the provision of a connection of the indicated character whereby the lid or cover may be retained in various opened positions.

The invention also resides in the simple, inexpensive and efficient construction constituting a resilient connection between a container or receptacle and its lid or cover.

The connection of the present invention is advantageously applicable to receptacles or cans used under counters in lunchrooms, cafeterias, and other places to receive waste matter and refuse, although the invention is applicable to other forms of containers or receptacles provided with a lid or cover.

The nature of the invention and its distinguishing features and advantages will appear when the following specification is read in connection with the accompanying drawing, in which Figure 1 is a view of a receptacle and its lid connected in accordance with the invention, the receptacle being shown partly in section, and the lid also being shown in section; the lid being shown in closed position in full lines and in a partly opened position in dot-and-dash lines Fig. 2 is a view similar to Fig. 1, but showing the lid swung into its fully opened position;

Fig. 3 is an enlarged fragmentary section taken on the line 3—3 of Fig. 1;

Fig. 4 is an enlarged fragmentary section taken on the line 4—4 of Fig. 5;

Fig. 5 is an enlarged section of the connection, showing a portion of the receptacle and also a portion of the lid in partly opened position.

Referring now more particularly to the several views of the drawing, it will be apparent that there has been shown, by way of example, a receptacle or a container 10, and a lid or cover 11 therefor. The receptacle or container 10 is cylindrical and the lid or cover 11 is circular and has a depending flange 12 in the present instance. The upper open end of the receptacle 10 has a reinforcing and thickening ring 13 secured thereto on the outside thereof. The receptacle 10 has handles 14, and the lid 11 has handles 15 and 16.

In accordance with the invention, the lid 11 is connected with the receptacle 10 so as to be swung flatwise from its closed horizontal position to a partly opened vertically-disposed position, and to be swung or rotated from said partly opened position to a fully opened position by means presently to be described. Use is made of a rotatory member, pivot or arbor 17, having a head 18 on one end. The member 17 extends through the upper end of the receptacle and also through the ring 13. The head 18 of the member 17 is disposed on the inside of the receptacle, and the opposite end of the member 17 projects on the outside of the receptacle. Connecting members 19 are secured, as at 20, to the flange 12 of the lid on the inside thereof. Each member 19 has a laterally-extending portion 21 on one end thereof and its opposite end has a laterally-extending portion 22. The portion 22 of one member 19 is disposed adjacent and in spaced relation to the portion 22 on the other member 19. The outer projecting end of the member 17 is disposed between the portions 22 and is pivotally or hingedly connected therewith by a cotter pin or equivalent means 23 to provide a hinge or pivotal connection between the portions 22 and the member 17. A coil expansion spring 24 surrounds the member 17 and one end thereof bears against the head 18 and its opposite end bears against the adjacent side wall portion of the receptacle. The inner projecting part of the member 17 and the spring 24 are enclosed by a cap 25 secured to the wall of the receptacle on the inside thereof. The laterally-extending portions 22 are rounded eccentric to the pivot 23, as at 26, so as to serve as cams in coaction with the wall of the receptacle and the spring 24 for a purpose to appear.

When the lid 11 is in a closed position, as shown in Fig. 1, the spring 24 urges the laterally extending portions 21 and 22 in contact with the ring 13 surrounding the upper end of the receptacle and thus effectually retains the lid in its closed position, and also prevents edgewise or sliding movement of the lid in relation to the upper end of the receptacle 10. The lid 11 may be swung upwardly from its closed position to a substantially vertically-disposed position on the means 23, which constitutes a pivot or hinge making this movement possible. After the lid 11 has been swung to this partly opened or vertically-disposed position, it may be rotated or swung downwardly on a horizontal axis, which is provided by the member 17 which turns or rotates in the bearing provided by the upper end of the receptacle and the ring 13. The lid may be swung downwardly to a fully opened position in which it will be disposed substantially vertically in close proximity to the side wall of the receptacle 10, as shown most clearly in Fig. 2. The lid 11 may be turned in either direction when it is disposed in a vertical position either in fully opening the lid or in closing the lid.

The lid 11 may be swung upwardly from its horizontal closed position to a partly opened position and will be held in the partly opened position by reason of the cam action of the portions 22 of the ring 13 and the resilient action of the spring 24.

From the foregoing it will be obvious that the advantages and objects of the invention may be attained. It will also be obvious that the handles 14 serve for carrying the receptacle; that the handle 15 serves for moving the lid to its opened or closed position, and that the handle 16 serves for dumping the contents of the receptacle therefrom when the lid is in its opened position.

I claim:

1. The combination with a receptacle, of a lid for the receptacle, a rotary member extending through and supported by a wall of said receptacle, and means including a pivot extending transversely through said member hingedly connecting the lid with said member, the provision and arrangement being such that said lid may be swung in two different directions to opened and closed positions in relation to the receptacle.

2. The combination with a receptacle open at the top, of a lid for the receptacle, a rotatory member extending through and supported by a wall of the receptacle near the top thereof, and means including a pivot extending transversely through said member hingedly connecting the lid with said member, the provision and arrangement being such that said lid may be swung flatwise and then edgewise from its closed position to its opened position below the top of the receptacle close to one side thereof, and also to be swung reversely to the aforesaid manner from the opened position to its closed position on the top of the receptacle.
3. The combination with a receptacle, of a lid for the receptacle, a resilient connection connecting the lid with the receptacle whereby the lid may be swung in two different directions to opened and closed positions in relation to the receptacle, and means on the lid which is engageable with the receptacle so as to coact with said connection to hold the lid in various opened positions.

4. The combination with a receptacle, of a cover for the upper open end of the receptacle, a horizontal member rotatably supported by a wall of said receptacle, said member having a head, an expansion coil spring surrounding said member and disposed between said head and the adjacent wall portion of the receptacle, and a hinge connection including a pivot extending transversely through said member connecting the cover with the horizontal member, as and for the purpose specified.

5. The combination with a receptacle, of a lid for said receptacle and adapted to rest on the open end thereof, members secured to said lid having spaced laterally-extending portions, a connecting member carried by said receptacle, and a pivot extending through said connecting member and said laterally-extending portions to connect said lid with the receptacle for pivotal movement to opened and closed positions in relation thereto, and said first-mentioned members being disposed in engagement with said receptacle when the lid is in its closed position, to prevent edgewise movement of the lid, and thus eliminating strain on said pivotal connection.

6. The combination with a receptacle, of a lid for said receptacle and adapted to rest on the open end thereof, members secured to said lid having spaced laterally-extending portions, a connecting member carried by said receptacle, a pivot extending through said connecting member and said laterally-extending portions to connect said lid with the receptacle for pivotal movement to opened and closed positions in relation thereto, and resilient means bearing on said receptacle and connecting member, said laterally-extending portions serving as cams in coaction with the receptacle and resilient means to retain the lid in various open positions.

7. The combination with a receptacle, of a lid for the receptacle, and a resilient connection connecting the lid with the receptacle, whereby the lid may be swung from its closed horizontal position to a vertical position, and then be rotated to a fully opened position disposed substantially parallel to the side wall of the receptacle, said connection including a rotatable member supported by a wall of the receptacle and extending laterally with respect thereto, and a pivot carried by said lid which extends transversely through said member.

8. The combination with a receptacle, of a cover for the open end of the receptacle, a horizontal member rotatably supported by a wall of said receptacle, said member having a head, an expansion coil spring surrounding said horizontal member and disposed between said head and wall, and a pivot secured to said cover which extends transversely through said horizontal member.

9. The combination with a receptacle, of a cover for the open end of the receptacle, a pivot extending laterally from the side wall of the receptacle and rotatable with respect thereto, and a pivot carried by the cover and extending transversely through the first pivot, the provision and arrangement being such that the cover may be swung to opened and closed positions with respect to the open end of the receptacle, and also swung to a position at one side of the receptacle.

MORRIS STAHL.